May 5, 1931. W. H. C. LASSEN 1,804,170
METHOD OF MAKING MOTION PICTURE SCREENS
Filed Jan. 12, 1929
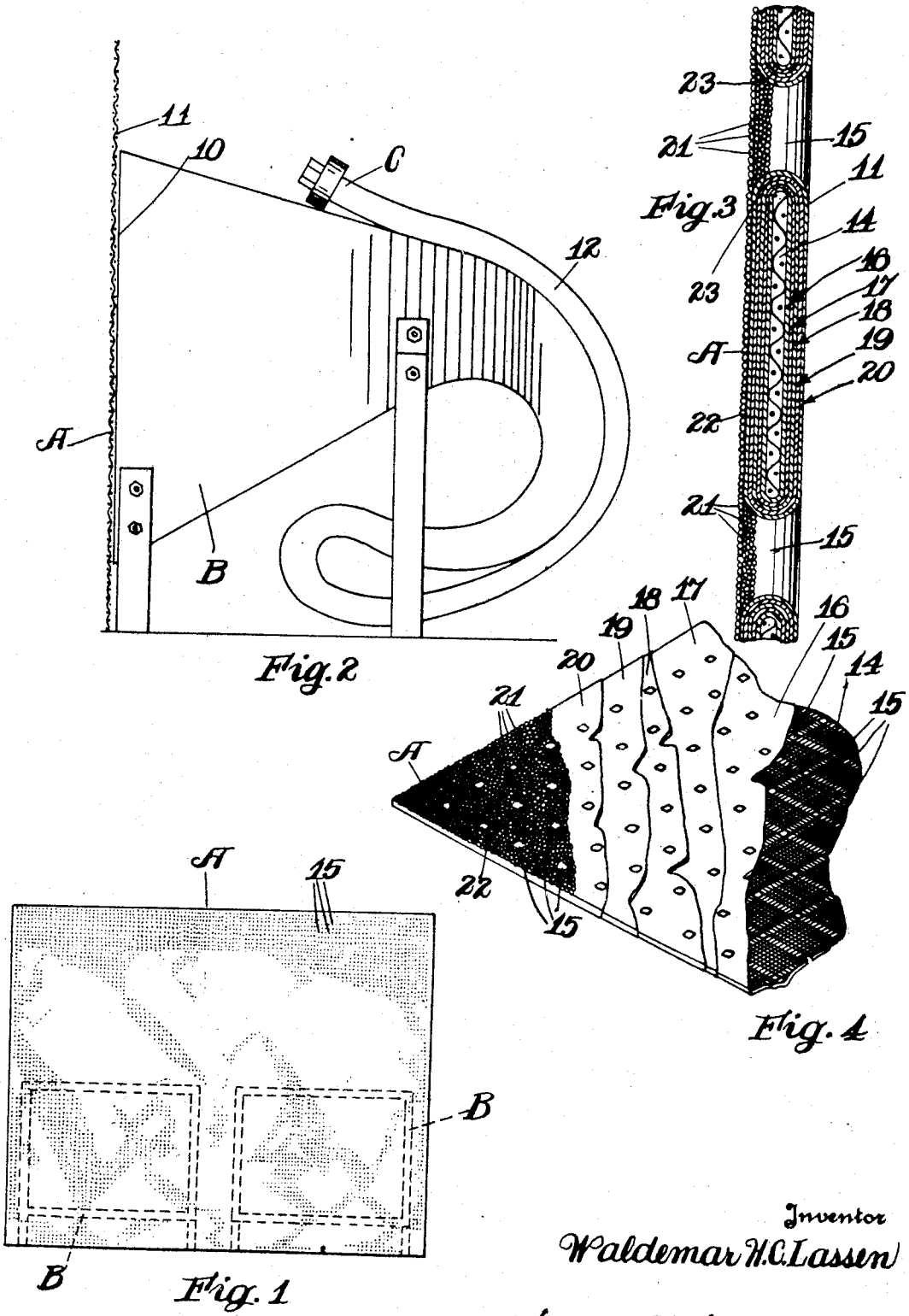
Inventor
Waldemar H. C. Lassen
By Horace Pircher
Attorney Patented May 5, 1931

1,804,170

UNITED STATES PATENT OFFICE

WALDEMAR H. C. LASSEN, OF ST. PAUL, MINNESOTA

METHOD OF MAKING MOTION PICTURE SCREENS

Application filed January 12, 1929. Serial No. 332,001.

My invention consists in the method of making a motion picture screen which may be used with a vitaphone so that sound can freely pass through the same, and consists in taking a piece of cloth or other flexible material with a series of virtually equally spaced small holes through the same. This material is preferably of a bluish cast or a pure white, such as squared voile or any other suitable similar material having a series of openings so that sound may be readily passed through the same.

The method is carried out by treating the cloth or flexible material with a suitable elastic material which may be made up of a mixture of wax, linseed oil, white lead, turpentine, and a drier, which are heated and thoroughly mixed together. I then put some chinese blue into the same and treat the perforated material by brushing or otherwise applying the same to both sides of the perforated material.

I then blow out the holes in the material so as to maintain the series of virtually equally spaced holes or passageways through the material. The fabric of the material becomes impregnated with the filler to provide a flexible screen.

After this first impregnated material is sufficiently dry, the surface is sanded to thoroughly smooth the same and then I apply several coats of flat white, blowing out the openings to keep the passageways clear in the material between each treatment or coat of flat white and allowing each coat of flat white to thoroughly dry and sanding between each operation to give the desired smooth finish to the screen. As many coats of flat white as may be desired may be applied.

I then apply a coat of white enamel of a suitable nature to the finished side, after which the holes are thoroughly cleaned by blowing with air or other suitable means and I then blow or otherwise apply a layer of minute glass particles or globules to the finished side of the screen, and then permit the same to thoroughly dry.

This provides a moving picture screen with a series of virtually equally spaced small openings through the screen, the finished surface between the openings being covered by minute glass particles or glass globules or any other suitable small reflecting particles. This screen is particularly adapted for use in moving picture theaters as a screen for receiving or reflecting the picture, requiring much less light and yet giving a sharp, distinct, soft picture or image, particularly adapted to permit sound to pass through the screen. Thus my screen is very adaptable for use in the production of vitaphone pictures where the sound reproducing means may be placed directly back of the screen and permitting the sound to travel through the screen, yet providing a sufficient background of a very desirable reflecting nature to give a much finer reproduction of the moving picture.

I have found my screen to be equally adaptable to the reproduction of moving pictures or other stereopticon pictures owing to the fact that the small holes in the screen provide dark spots which are not visible but which have a tendency of breaking up or screening the picture or image in virtually a similar manner as is employed in printing where a screen is used in making the plates for reproducing the picture. The openings in the screen seem to break up the body of the picture so that the picture will stand out more clear and sharp and apparently be much more pleasing to the eye than a picture on the ordinary screen.

My screen overcomes the heretofore difficulties of not being able to properly project the sound from the sound means in connection with moving talking pictures and I have accomplished a result of a very desirable nature in the production of my screen.

A further advantage of my screen consists in making a screen with a reflecting surface which does not need as strong a light owing to the body and reflective properties of the glass globules or particles and in providing the holes which break up the body of the screen sufficiently to prevent cracking and thereby forming a long-wearing screen.

My screen is impervious to water or moisture so that the screen may be readily washed without any damage to the screen, thus permitting it to be kept clean and clear virtually during the life of the screen.

It is apparent that the body or perforated sheet of my screen may be made of fire-proof material and treated in a manner so as to impregnate the same with a clear white background to which the reflecting glass globules are attached or other glass pearls or particles so that the screen is virtually fire-proof and is provided with the openings for the purposes hereinbefore set forth.

An important feature of my screen resides in the wonderful manner in which it reproduces the picture. I believe I have largely overcome distortion in this screen from virtually any angle in the theater and I attribute this to the breaking up or screening of the picture by reason of the series of openings which leave little blank spots not visible to the observer but clearly apparent in the screen. This, together with the fact that the glass globules extend into the edge of the openings provide a screen adapted to overcome distortions, a very desirable feature in the moving picture screen.

In the drawings Figure 1 illustrates diagrammatically a front view of my screen as it would appear in use with horns such as are used in vitaphone moving picture productions.

Figure 2 is an enlarged diagrammatic side view of a portion of my screen and one of the reproducing horns or units.

Figure 3 is an enlarged sectional detail of my screen.

Figure 4 is a perspective of a portion of my screen showing the process of making the same.

My motion picture screen A is illustrated diagrammatically in Figure 1 to show a front view and to show in dotted outline the position of the reproducing units or horns B positioned back of the same. One or more of the horns or units B may be used in a theater and these horns are placed with the front edge 10 of the same adjacent the back surface 11 of the screen A. The front edge is at the sound producing opening of the unit B. The reproducing unit C of the unit B is positioned at the small end of the horn or unit B and when a sound is reproduced it is extended through the tubular member 12 which enlarges toward the edge 10. It is virtually essential in talking moving pictures to employ a screen which is comparatively porous so as to permit sound to pass readily through the same. Heretofore such a porous screen has been employed of an ordinary nature. My screen A is designed to provide a more brilliant reproducing surface and a surface which requires less light than the ordinary screen and which can be thoroughly cleaned at any time by washing or otherwise cleaning it, as the screen itself is virtually impervious to moisture, thus permitting it to be readily cleaned.

The method of making my screen A consists in treating a flexible textile sheet 14, which is formed with a series of holes 15, with a suitable elastic material which may be made up of a mixture of wax, linseed oil, white lead, turpentine, and a drier, and after being thoroughly mixed and a suitable amount of chinese blue added thereto, is applied to both sides of the perforated sheet 14. I then blow out the holes in the material so as to keep the openings 15 clear, and this first treatment is designated by the layer of material 16, illustrated in Figure 4. My method is carried out by applying the coats 17, 18, 19 and 20, as designated in the means of carrying out my invention as hereinbefore set forth, so that the several coats or layers 16 to 20, inclusive, are applied to the body of the sheet 14, keeping the openings 15 clear so that a series of holes 15 are provided through the screen through which the sound from the unit B may freely pass.

In carrying out my method, when the last coat 20 is applied to the sheet 14 before the same is entirely dry I apply minute glass particles or globules 21 in a manner to form a layer of these particles to provide the finished surface 22. This finished surface 22 extends over the entire surface of the sheet 14, leaving the openings 15 clear so that sound can pass through the same.

It will be noted that in making my screen A the surface extending in through the opening will curve in such a manner as to provide the arcuated edge 23 about the openings 15. The small glass globules extend into these openings as illustrated in Figure 3, and thus provide a reflecting surface extending into the openings 15. I have found that these arcuated surfaces 23 with the layer of glass globules 21 thereon tend to provide a motion picture screen of a very desirable nature and one which apparently overcomes distortion on the screen. This feature together with the breaking up of the picture by the openings 15 in a manner similar to the screening of a picture in offset press work, provides a reproduction of the motion picture on the surface 22 of my screen A of a finer nature than anything I have known or seen heretofore. I believe the openings 15 with the arcuated surface or edge have a tendency to make the picture stand out similar to the stereopticon reproductions and thus provide a very desirable reproducing surface also permitting the sound from the sound reproducing units B to be passed through the screen without material interference or muffling and thereby providing a very desirable reproducing screen for talking moving pictures. My screen is equally adapted to motion pictures without talking units and provides a better reproduction of the picture than where the screen is formed with a solid body without the openings therethrough.

The body of my screen 14 may be made of fire-proof material, or a canvas textile sheet having the perforations formed therein may be treated with a fire-proofing substance or may have a layer of fire-proofing material applied thereto so as to make the screen A substantially fire-proof. It is also obvious that the finishing coats may be of fire-proofing material thereby providing a finished screen of a desirable nature when completed with the sound openings extending therethrough. It may also be desirable to treat the glass globules with acid or otherwise treat them to make them of a dull white nature rather than of a highly polished clear nature. When used in this manner the little glass globules are of such a nature as to soften the eye strain.

I have described the principles of my method in accordance with the patent statutes and while I have illustrated a particular formation and construction I desire to have it understood that the particular number of coats of finish or means of finishing the body of the screen are not necessary and I desire to protect my invention within the scope of the following claims:

I claim:

1. The method of making a motion picture screen consisting, in impregnating a perforated sheet with highly elastic and pliable material, flowing the openings in said sheet clean of impregnating material, and covering the surface between the openings with a layer of small fluorized glass globules.

2. The method of making a screen for exhibiting motion pictures and the like, consisting in applying a finish coating of an adhesive dressing and minute glass globules to a perforated sheet to extend into the perforations, in a manner to leave sound passageway through the finished screen.

3. A screen for exhibiting motion pictures having a perforated fabric sheet, an adhesive dressing applied over said sheet in a manner to keep the perforations open, and a layer of glass globules applied to said dressing extending into the perforations.

4. The method of making a picture screen consisting in treating a perforated water proofed fabric with an adhesive, passing air through the perforations to keep them open, and forcing small reflecting globules against the adhesive to attach the same.

5. A motion picture screen including, a perforated body sheet, and a coating of adhesive, glass globules applied thereto, said globules extending partially over said perforations.

6. A motion picture screen including, a perforated body sheet, a coating of adhesive, and glass globules applied thereto partially bridging said perforations.

WALDEMAR H. C. LASSEN.